United States Patent
Wei et al.

(10) Patent No.: US 9,521,084 B2
(45) Date of Patent: Dec. 13, 2016

(54) NETWORK CODING METHOD, RELAY APPARATUS, AND SELECTION APPARATUS

(71) Applicant: Huawei Technologies Co., Ltd., Shenzhen, Guangdong (CN)

(72) Inventors: Lili Wei, Shanghai (CN); Wen Chen, Shanghai (CN); Yuejun Wei, Moscow (RU); Ying Jin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 266 days.

(21) Appl. No.: 14/451,691

(22) Filed: Aug. 5, 2014

(65) Prior Publication Data

US 2014/0341022 A1 Nov. 20, 2014

Related U.S. Application Data (63) Continuation of application No. PCT/CN2013/070913, filed on Jan. 24, 2013.

(30) Foreign Application Priority Data

Feb. 10, 2012 (CN) .......................... 2012 1 0030171

(51) Int. Cl.
*G01R 31/08* (2006.01)
*H04L 12/811* (2013.01)
(Continued)

(52) U.S. Cl.
CPC ........... *H04L 47/38* (2013.01); *H04B 7/15521* (2013.01); *H04L 1/0002* (2013.01); *H04L 47/25* (2013.01); *H04L 2001/0097* (2013.01)

(58) Field of Classification Search
CPC ...................................................... H04L 47/38
(Continued)

(56) References Cited

U.S. PATENT DOCUMENTS 7,916,665 B2 3/2011 Le Bars et al.
2008/0089333 A1* 4/2008 Kozat .................... H04L 1/004
370/390

(Continued)

FOREIGN PATENT DOCUMENTS

CN 101409602 A 4/2009
CN 101697510 A 4/2010
(Continued)

OTHER PUBLICATIONS

Emanuele Viterbo, et al., "A Universal Lattice Code Decoder for Fading Channels", IEEE transactions on Information Theory, vol. 45, No. 5, Jul. 1999, p. 1639-1642.

(Continued)

*Primary Examiner* — Samina Choudhry (57) ABSTRACT

Embodiments of the present invention relate to the field of communications, and provide a network coding method, a relay apparatus and a selection apparatus, which can avoid a case that a network coding system matrix is not full rank, and improve correctness of decoding. The network coding method includes: obtaining network coding information, where the network coding information includes information of a candidate network coding vector set and a candidate transmission rate set, and transmission rates in the candidate transmission rate set are in one-to-one correspondence with network coding vectors in the candidate network coding vector set; selecting a full rank network matrix according to the network coding information; and coding received source node information according to the full rank network matrix. The network coding method, relay apparatus and selection apparatus provided in the embodiments of the present invention are used for network coding.

15 Claims, 6 Drawing Sheets

(51) Int. Cl.
*H04B 7/155* (2006.01)
*H04L 12/825* (2013.01)
*H04L 1/00* (2006.01)

(58) Field of Classification Search
USPC .......................................................... 370/230
See application file for complete search history.

(56) References Cited

U.S. PATENT DOCUMENTS

2009/0252146 A1  10/2009  Luo et al.
2011/0243324 A1* 10/2011  Lima .................... H04L 1/1812
                                                   380/212

FOREIGN PATENT DOCUMENTS

EP        2 264 930 A1    12/2010
EP        2 360 870 A1     8/2011

OTHER PUBLICATIONS

Ralf Koetter, et al., "An Algebraic Approach to Network Coding", IEEE/ACM Transactions on Networking, vol. 11, No. 5, Oct. 2003, p. 782-795.

Bobak Nazer, et al., "Compute-and-Forward: Harnessing Intererence through Structured Codes", IEEE Trans Info Theory, to Appear, Jun. 13, 2011, 23 pages.

Sachin Katti, et al., "Embracing Wireless Interference: Analog Network Coding", Aug. 27-31, 2007, 12 pages.

U. Fincke, et al., "Improved Methods for Calculating Vectors of Short Length in a Lattice, Including a Complexity Analysis", Mathematics of Computation, vol. 44, No. 170, Apr. 1985, p. 463-471.

Shuo-Yen Robert Li, et al., "Linear Network Coding", IEEE Transactions on Information Theory, vol. 49, No. 2, Feb. 2003, p. 371-381.

Rudolf Ahlswede, et al., "Network Information Flow", IEEE Transactions on Information Theory, vol. 46, No. 4, Jul. 2000, p. 1204-1216.

Shengli Zhang, et al., "Physical Layer Network Coding", 16 pages.

Bobak Nazer, et al., "Reliable Physical Layer Network Coding", Proceedings of the IEEE, vol. 99, No. 3, Mar. 2011, p. 438-460.

Shao-guo Tao, et al., "Survey of Network Coding", Journal of Chinese Computer Systems, vol. 29, No. 4, Apr. 4, 2008, 18 pages.

Bobak Nazer, et al., "On Decoding Equations with Partial Channel State Information", Information Sciences and Systems, 2010 IEEE, Mar. 17, 2010, 2 pages.

* cited by examiner

NETWORK CODING METHOD, RELAY APPARATUS, AND SELECTION APPARATUS

CROSS-REFERENCE TO RELATED APPLICATIONS

This application is a continuation of International Application No. PCT/CN2013/070913, filed on Jan. 24, 2013, which claims priority to Chinese Patent Application No. 201210030171.X, filed on Feb. 10, 2012, both of which are hereby incorporated by reference in their entireties.

TECHNICAL FIELD

The present invention relates to the field of communications, and in particular, to a network coding method, a relay apparatus, and a selection apparatus.

BACKGROUND

A conventional data transmission manner of a communications network is storing and forwarding, that is, a node other than a source apparatus and a sink apparatus of data is only responsible for routing and does not perform any processing on content of the data, and a relay node plays a role of a forwarder. The source apparatus can be configured to perform sending and/or coding of data, and the sink apparatus can be configured to perform receiving and/or decoding of data.

Network coding is an information exchange technology combining routing and coding, and has a core idea of performing linear or non-linear processing, in each node on the network, on information received from each channel, and then forwarding the information to a downstream node, where the relay node plays a role of a coder or a signal processor.

In the prior art, in a multi-source multi-relay (MSMR, Multi-Source Multi-Relay) system, when a fading channel exists, each relay node calculates an integer vector to serve as a network coding vector, and then forwarded source node information is combined linearly according to the integer, without a need of decoding information of each source. The final sink apparatus receives various network-coded signals forwarded by all relay nodes, and information of all source nodes can be obtained through solving a system of equations.

In the network coding method, when each relay node calculates the integer network coding vector, the network coding vector requires a transmission bit rate of the node to be maximized. However, when each relay node is optimized separately to obtain the network coding vector, the correctness of decoding is low or decoding cannot be performed correctly.

SUMMARY

Embodiments of the present invention provide a network coding method, a relay apparatus and a selection apparatus, which can avoid a case that a network coding system matrix is not full rank, and improve correctness of decoding.

In order to achieve the foregoing objective, the embodiments of the present invention adopt the following technical solutions:

In one aspect, a network coding method is provided and includes:

obtaining network coding information, where the network coding information includes information of a candidate network coding vector set and a candidate transmission rate set, and transmission rates in the candidate transmission rate set are in one-to-one correspondence with network coding vectors in the candidate network coding vector set;

selecting a full rank network matrix according to the network coding information; and coding received source node information according to the full rank network matrix.

In one aspect, a network coding method is provided and includes:

receiving network coding information sent by a relay apparatus, where the network coding information includes information of a candidate network coding vector set and a candidate transmission rate set, and transmission rates in the candidate transmission rate set are in one-to-one correspondence with network coding vectors in the candidate network coding vector set;

selecting a full rank network matrix according to the network coding information; and sending the full rank network matrix to the relay apparatus, so that the relay apparatus codes received source node information according to the full rank network matrix.

In one aspect, a relay apparatus is provided and includes:

a processor, configured to obtain network coding information, where the network coding information includes information of a candidate network coding vector set and a candidate transmission rate set, and transmission rates in the candidate transmission rate set are in one-to-one correspondence with network coding vectors in the candidate network coding vector set;

a selection unit, configured to select a full rank network matrix according to the network coding information; and a coding unit, configured to code received source node information according to the full rank network matrix.

In one aspect, a selection apparatus is provided and includes:

a receiver, configured to receive network coding information sent by a relay apparatus, where the network coding information includes information of a candidate network coding vector set and a candidate transmission rate set, and transmission rates in the candidate transmission rate set are in one-to-one correspondence with network coding vectors in the candidate network coding vector set;

a selection unit, configured to select a full rank network matrix according to the network coding information; and a sender, configured to send the full rank network matrix to the relay apparatus, so that the relay apparatus codes received source node information according to the full rank network matrix.

Embodiments of the present invention provide a network coding method, a relay apparatus and a selection apparatus. The network coding method includes: obtaining network coding information, where the network coding information includes information of a candidate network coding vector set and a candidate transmission rate set, and transmission rates in the candidate transmission rate set are in one-to-one correspondence with network coding vectors in the candidate network coding vector set; selecting a full rank network matrix according to the network coding information; and coding received source node information according to the full rank network matrix. In this way, the full rank network matrix is selected according to the information of the candidate network coding vector set and candidate transmission rate set in the network coding information, and the full rank network matrix ensures effectiveness of coding of received source node information performed by each relay apparatus on the network, so that a sink apparatus performs decoding correctly. Therefore, a case that a network coding system matrix is not full rank can be avoided, and correctness of decoding can be improved.

BRIEF DESCRIPTION OF THE DRAWINGS

To describe the technical solutions according to the embodiments of the present invention or in the prior art more clearly, the following briefly introduces accompanying drawings required for describing the embodiments or the prior art. Apparently, the accompanying drawings in the following descriptions merely show some of the embodiments of the present invention, and persons of ordinary skill in the art may still derive other drawings according to these accompanying drawings without creative efforts.

DETAILED DESCRIPTION

The following clearly describes technical solutions in the embodiments of the present invention with reference to the accompanying drawings in the embodiments of the present invention. Apparently, the embodiments to be described are merely a part rather than all of the embodiments of the present invention. All other embodiments obtained by persons of ordinary skill in the art based on the embodiments of the present invention without creative efforts shall fall within the protection scope of the present invention.

Embodiment 1

Figure 1:
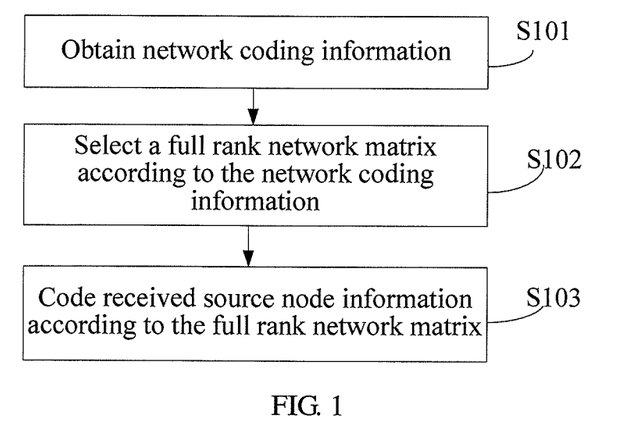
FIG. 1 is a flow chart of a network coding method according to an embodiment of the present invention.

The present invention provides a network coding method according to an embodiment. As shown in FIG. 1, the method includes:

S101: Obtain network coding information. The network coding information includes information of a candidate network coding vector set and a candidate transmission rate set, and transmission rates in the candidate transmission rate set are in one-to-one correspondence with network coding vectors in the candidate network coding vector set.

S102: Select a full rank network matrix according to the network coding information.

S103: Code received source node information according to the full rank network coding information matrix.

In this way, the full rank network matrix is selected according to the information of the candidate network coding vector set and candidate transmission rate set in the network coding information, and the full rank network matrix ensures effectiveness of coding of received source node information performed by each relay apparatus on the network, so that a sink apparatus performs decoding correctly. Therefore, a case that a network coding system matrix is not full rank can be avoided, and correctness of decoding can be improved.

Figure 2:
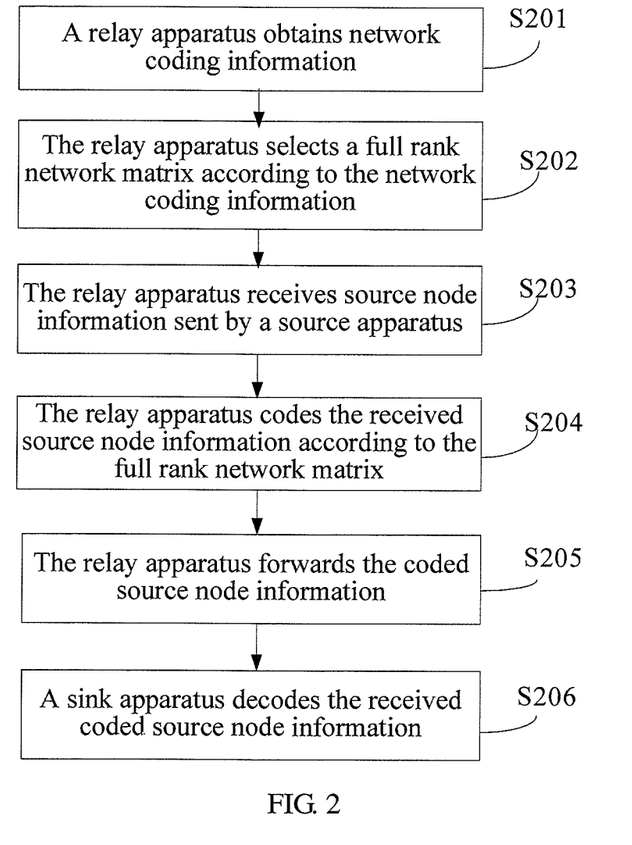
FIG. 2 is a flow chart of another network coding method according to an embodiment of the present invention.

Illustratively, the following describes an optional solution where a relay apparatus serves as an executive body, as shown in FIG. 2.

S201: The relay apparatus obtains network coding information.

The network coding information includes information of a candidate network coding vector set and a candidate transmission rate set, and transmission rates in the candidate transmission rate set are in one-to-one correspondence with network coding vectors in the candidate network coding vector set. The network coding information may be generated automatically by the relay apparatus, and the network coding vector may be generated in various manners, for example, through calculation by using a formula. Each network coding vector corresponding to the relay apparatus may be used to obtain a transmission rate of the relay apparatus through calculation, where the transmission rate is a transmission rate when the relay apparatus performs coding by using the network coding vector. Therefore, one network coding vector is corresponding to one transmission rate. Particularly, the relay apparatus can also obtain network coding information sent by another relay apparatus on the network.

A network coding vector a of a relay apparatus maximizes a transmission rate of the relay apparatus, or equivalently, minimizes a value of $a^T G a$, where a matrix G is a matrix that can be calculated through a channel parameter, $a^T$ is a transposition of the vector a, and "T" is a transposition symbol. The following steps may be executed:

The relay apparatus can obtain all non-zero integer vectors to be used for selection of a candidate network coding vector set. In the embodiment of the present invention, the non-zero integer vectors are obtained according to the Fincke-Pohst (FP, Fincke-Pohst) method, but the vector obtaining method is not limited in the present invention. By using the Fincke-Pohst method, a non-zero integer vector d satisfying $d^T G d \leq E$ and a constant E corresponding to the integer vector d may be obtained according to the input matrix G.

The relay apparatus selects a vector a satisfying $a^T G a \leq C$ from the integer vector d, to form a vector set M and a corresponding rate set N; each vector in the vector set M has a corresponding transmission rate in the rate set N; C is a constant; and, the matrix G satisfies a formula $$G = I - \frac{P(hh^T)}{1 + P\|h\|^2},$$

where, I is a unit matrix, P is transmit signal power, h is a channel vector from a source apparatus to the relay apparatus, and $\|h\|^2$ is a square of a modulus of a vector h.

When the number of vectors in the vector set M is greater than or equal to a preset number t, the transmission rates in the rate set N are sorted in descending order, and the first t transmission rates that are relatively great are selected to form the candidate transmission rate set; and, vectors corresponding to the first t transmission rates that are relatively great are selected from the vector set M to from the candidate network coding vector set.

Particularly, the constant C may be a dynamically set constant. When the number of vectors in the vector set M is smaller than the preset number t, a value of the constant C is increased, for example, the constant C may be doubled; a vector a satisfying $a^TGa \leq C$ is selected from the integer vector, to form the vector set M and a corresponding rate set N; the comparison and calculation processes are repeated until the number of vectors in the vector set M is greater than or equal to the preset number t, the transmission rates in the rate set N are sorted in descending order, and the first t transmission rates that are relatively great are selected to form the candidate transmission rate set; and, vectors corresponding to the first t transmission rates that are relatively great are selected from the vector set M to form the candidate network coding vector set.

Particularly, t is a value set according to a specific condition, and is generally set to be equal to 5. However, if it is found that no full rank matrix can be selected by using the candidate network coding vector sets that are generated through calculation by using the current t, a range of t may be extended, and then corresponding calculation and selection are performed.

It should be noted that, C is a constant having a range limiting function in vector calculation. In initialization of C, to simplify the calculation process, the following steps may be executed:

The relay apparatus obtains a vector b corresponding to a minimum characteristic value of the matrix G, for example, the vector b may be obtained through calculation; a numeral greater than 0 in the vector b is replaced with +1, and a numeral smaller than 0 is replaced with −1, to obtain an integer vector c; and, based on $C=c^TGc$, the relay apparatus selects the vector a satisfying $a^TGa \leq C$ from the integer vector, to form the vector set M.

For example, for a three-source three-relay system, the number t of vectors in each candidate network coding vector set of the relay apparatus is set to be equal to 5. Signal power P of each source is set to be equal to 10 dB, and variances of a fading channel and an additive Gaussian channel are normalized to 1.

The fading channel vectors of the three relays are generated randomly as:

$h_1 = [0.9730, 0.4674, 0.5103]^T, h_2 = [-1.7291, 0.7166, -0.5856]^T, h_3 = [-0.3912, 1.4407, -0.8115]^T$.

The matrix G is obtained through calculation by using a formula $$G = I - \frac{P(hh^T)}{1 + P\|h\|^2}:$$

each relay may generate a corresponding matrix G according to the fading channel vector of this relay:

$$G_1 = \begin{bmatrix} 0.3794 & -0.2981 & -0.3254 \\ -0.2981 & 0.8568 & -0.1563 \\ -0.3254 & -0.1563 & 0.8293 \end{bmatrix},$$

$$G_2 = \begin{bmatrix} 0.2424 & 0.3140 & -0.2566 \\ 0.3140 & 0.8699 & 0.1063 \\ -0.2566 & 0.1063 & 0.9131 \end{bmatrix},$$

$$G_3 = \begin{bmatrix} 0.9488 & 0.1887 & -0.1063 \\ 0.1887 & 0.3052 & 0.3914 \\ -0.1063 & 0.3914 & 0.7796 \end{bmatrix}.$$

In the embodiment of the present invention, each relay apparatus generates a candidate network coding vector set which is corresponding to a candidate transmission rate set. For example, for a relay apparatus 1, the relay apparatus 1 selects a vector a satisfying $a^TGa \leq C$ from an integer vector, where $a_{11} = [1\ 0\ 0]^T$ is an optimal network coding vector of the relay apparatus 1, and a corresponding transmission rate of the relay apparatus 1 is 0.4846; $a_{12} = [2\ 1\ 1]^T$ is a second optimal network coding vector of the relay apparatus 1, and a corresponding transmission rate of the relay apparatus 1 is 0.4620; $a_{13} = [1\ 1\ 1]^T$ is a third optimal network coding vector of the relay apparatus 1, and the like, so as to obtain a vector set M and a corresponding rate set N. In this embodiment, the number of vectors in the vector set M is greater than or equal to a preset number 5, so transmission rates in the rate set N are sorted in descending order, the first 5 transmission rates that are relatively great are selected to form the candidate transmission rate set, and meanwhile, vectors corresponding to the first 5 transmission rates that are relatively great are selected from the vector set M to form the candidate network coding vector set. In this way, candidate network coding vector sets $S_1$, $S_2$ and $S_3$ and candidate transmission rate sets $L_1$, $L_2$ and $L_3$ are obtained as follows:

$$S_1 = \begin{bmatrix} 1 & 2 & 1 & 1 & 1 \\ 0 & 1 & 1 & 0 & 1 \\ 0 & 1 & 1 & 1 & 0 \end{bmatrix}$$

$L_1 = [0.4846, 0.4620, 0.3408, 0.2918, 0.2231]$ $$S_2 = \begin{bmatrix} 1 & 2 & 3 & -1 & -2 \\ 0 & -1 & -1 & 1 & 1 \\ 0 & 1 & 1 & 0 & 0 \end{bmatrix}$$

$L_2 = [0.7087, 0.6785, 0.5572, 0.3625, 0.2694]$ $$S_3 = \begin{bmatrix} 0 & 0 & 1 & 0 & 1 \\ -1 & 1 & -2 & -2 & -3 \\ 1 & 0 & 1 & 1 & 2 \end{bmatrix}$$

$L_3 = [0.5987, 0.5935, 0.4384, 0.4165, 0.2902]$

The network coding information generated by the relay apparatus includes information of the network coding vector set S and the candidate transmission rate set L. Transmission rates in the candidate transmission rate set L are in one-to-one correspondence with network coding vectors in the candidate network coding vector set S.

S202: The relay apparatus selects a full rank network matrix according to the network coding information.

All transmission rates in the candidate transmission rate set are sorted in descending order, to obtain a test rate set. When the number of the relay apparatuses is n, the $n^{th}$ transmission rate in the test rate set is used as a test rate, and one network coding vector is selected from each candidate network coding vector set corresponding to the relay apparatus, to form a test coding vector matrix, where a transmission rate corresponding to the selected network coding vector is greater than or equal to the test rate. If the test coding vector matrix is a full rank matrix, it is determined that the test coding vector matrix is a full rank network matrix.

Particularly, step S202 may further include:

a. Sort all transmission rates in the candidate transmission rate set in descending order, to obtain a test rate set.

b. When the number of the relay apparatuses is n, use the $n^{th}$ transmission rate in the test rate set as a test rate.

c. Select one network coding vector from each candidate network coding vector set corresponding to the relay apparatus, where a transmission rate corresponding to the selected network coding vector is greater than or equal to the test rate.

d. If a test coding vector matrix cannot be formed according to the selected network coding vector, or a test coding vector matrix formed according to the selected network coding vector is not a full rank matrix, sequentially use a transmission rate next to the current test rate in the test rate set as a new test rate, and repeat step c until it is determined that the test coding vector matrix is a full rank network matrix.

Illustratively, the three-source three-relay system is still used as an example for description. First, the selection apparatus sorts all transmission rates in the candidate transmission rate sets $L_1$, $L_2$ and $L_3$ in descending order, to obtain a test rate set L:

L=[0.7087,0.6785,0.5987,0.5935,0.5572,0.4846,. . .].

Then, the selection apparatus checks in descending order whether the test rate can be reached. Because the system has three relay apparatuses, the selection apparatus uses the $3^{rd}$ transmission rate in the test rate set, that is, 0.5987, as the test rate to perform matching in the system. For example, when 0.5987 is used as the test rate to perform matching in the system, the candidate network coding vector set $S_1$ of the relay apparatus 1 does not have a network coding vector with a corresponding transmission rate higher than 0.5987; the candidate network coding vector set $S_2$ of the relay apparatus 2 has two vectors $[1\ 0\ 0]^T$ and $[2\ -1\ 1]^T$ with corresponding relay apparatus transmission rates being 0.7087 and 0.6785 respectively, which are all higher than 0.5987; and, $[0\ -1\ 1]^T$ may be selected from the candidate network coding vector set $S_3$ of the relay apparatus 3. However, because the selection apparatus needs to select one specific network coding vector from each of the candidate network coding vector sets $S_1$, $S_2$ and $S_3$, to form a test coding vector matrix, but the candidate network coding vector set $S_1$ does not have such a vector, the test coding vector matrix does not exist. In this case, the $4^{th}$ transmission rate 0.5935 in the test rate set is used as a test rate, and the matching process is repeated until the test coding vector matrix exists and is a full rank matrix, and then it is determined that the test coding vector matrix is a full rank network matrix. The full rank network matrix $A_{prposed}$ that is finally obtained through matching is as follows:

$$A_{prposed} = \begin{bmatrix} 1 & 2 & 0 \\ 0 & -1 & 1 \\ 0 & 1 & 0 \end{bmatrix}$$

In this case, the transmission rate of the whole system is 0.4846, that is, when the system is under this transmission rate, the sink apparatus can correctly parse the source node information, and the transmission rate of each relay apparatus is high.

Particularly, vectors in the full rank network matrix $A_{prposed}$ according to the embodiment of the present invention are specific network coding vectors in the candidate network coding vector sets of the relay apparatuses, and the specific network coding vectors may be row vectors, and may also be column vectors. In the embodiment of the present invention, only column vectors are used as an example for description. When the specific network coding vectors are column vectors, a decoding manner of the sink apparatus changes accordingly. Variations or replacements can easily be obtained by a person skilled in the art within the technical scope disclosed by the present invention, so details are not repeated herein.

S203: The relay apparatus receives source node information sent by the source apparatus.

The source apparatus may be configured to perform data sending and/or coding, and in an actual application, the source apparatus may be implemented by using a sender.

S204: The relay apparatus codes the received source node information according to the full rank network matrix.

In this embodiment, the relay apparatus matches the network coding vector in the full rank network matrix with the network coding vector in the candidate network coding vector set, and an identical network coding vector d is obtained. The relay apparatus codes the received source node information according to the network coding vector d. Particularly, the methods of obtaining the network coding vector and performing coding by the relay apparatus are not limited thereto, and only an example is described herein.

Illustratively, in the three-source three-relay system, the relay apparatus 1 matches the network coding vector in the full rank network matrix with the vector in the candidate network coding vector set $S_1$, and an identical network coding vector $[1\ 0\ 0]^T$ is obtained; likewise, the relay apparatus 2 obtains a network coding vector $[2\ -1\ 1]^T$, and the relay apparatus 3 obtains a network coding vector $[0\ 1\ 0]^T$.

S205: The relay apparatus forwards the coded source node information.

The relay apparatus forwards the coded source node information, so that the sink apparatus decodes the coded source node information. Illustratively, in the three-source three-relay system, it is assumed that three sources respectively send source node information $x_1$, $x_2$ and $x_3$, the relay apparatus 1 codes the source node to obtain $1 \times x_1 + 0 \times x_2 + 0 \times x_3 = x_1$, the relay apparatus 2 codes the source node to obtain $2 \times x_1 + (-1) \times x_2 + 1 \times x_3 = 2x_1 + x_3 - x_2$, and the relay apparatus 3 codes the source node to obtain $0 \times x_1 + 1 \times x_2 + 0 \times x_3 = x_2$.

S206: The sink apparatus decodes the received coded source node information.

It should be noted that, after the relay apparatus selects the full rank network matrix, the relay apparatus may broadcast the full rank network matrix in the system, or send a notification to the sink apparatus so that the sink apparatus obtains information of the full rank network matrix. Particularly, the sink apparatus may be configured to perform data receiving and/or decoding, and may specifically implemented by using a receiver and a decoder.

The source node information received by the sink apparatus is O, P and Q. Equations $x_1 = O$, $2x_1 + x_3 - x_2 = P$, and $x_2 = Q$ are obtained according to the information of the full rank network matrix, and initial source node information is obtained through solving the system of equations.

Particularly, in an actual application, when the number of the relay apparatuses in the network system is greater than the number of the source apparatuses, the sink apparatus may select to decode source node information coded by the relay apparatuses in a same quantity as that of the source apparatuses, so as to reduce resource waste caused by excessive equation decoding. The coded source node information of the relay apparatus may be obtained through selection performed by the sink apparatus, and may also be sent to the sink apparatus by a fixed relay apparatus that is set by the system. The obtaining method is not limited in the present invention.

It should be noted that, the precedence of steps of the network coding method provided in the embodiment of the present invention may be appropriately adjusted, and the number of steps may also be correspondingly increased or reduced according to conditions. Variation methods can be easily derived by any technical person skilled in the art within the technical scope disclosed in the present invention, so details are not repeated herein.

In the network coding method provided in the embodiment of the present invention, a relay apparatus performs selection according to information of a candidate network coding vector set and a candidate transmission rate set in network coding information, to obtain a full rank network matrix. The full rank network matrix ensures effectiveness of coding of received source node information performed by each relay apparatus on the network, so that a sink apparatus performs decoding correctly. Therefore, a case that a network coding system matrix is not full rank can be avoided, and correctness of decoding can be improved.

Embodiment 2

Figure 3:
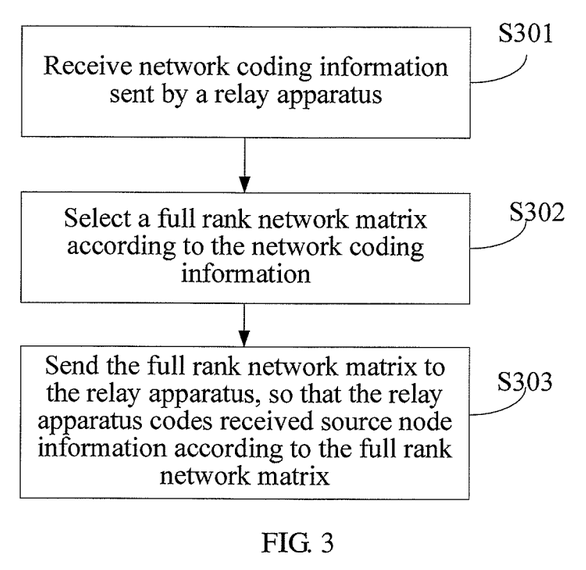
FIG. 3 is a flow chart of still another network coding method according to an embodiment of the present invention.

The present invention provides a network coding method according to an embodiment. As shown in FIG. 3, the method includes:

S301: Receive network coding information sent by a relay apparatus, where the network coding information includes information of a candidate network coding vector set and a candidate transmission rate set, and transmission rates in the candidate transmission rate set are in one-to-one correspondence with network coding vectors in the candidate network coding vector set.

S302: Select a full rank network matrix according to the network coding information.

S303: Send the full rank network matrix to the relay apparatus, so that the relay apparatus codes received source node information according to the full rank network matrix.

In this way, the full rank network matrix is obtained through selection according to the information of the candidate network coding vector set and candidate transmission rate set in the network coding information. The full rank network matrix ensures effectiveness of coding of received source node information performed by each relay apparatus on the network, so that a sink apparatus performs decoding correctly. Therefore, a case that a network coding system matrix is not full rank can be avoided, and correctness of decoding can be improved.

Figure 4:
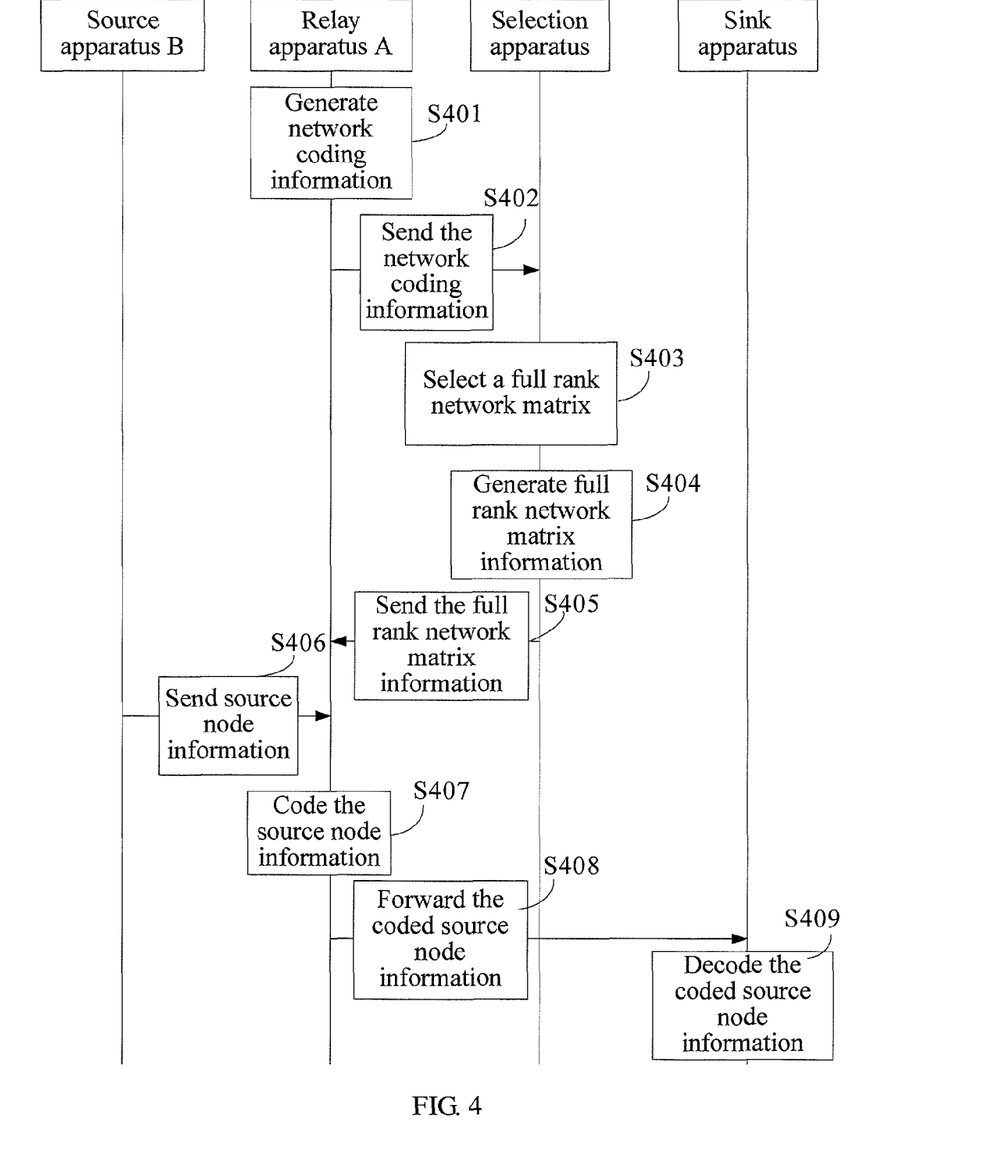
FIG. 4 is a flow chart of yet another network coding method according to an embodiment of the present invention.

Illustratively, the following describes an optional solution where a selection apparatus serves as an executive body, which is optionally shown in FIG. 4. A multi-source multi-relay network may have multiple relay apparatuses and source apparatuses. FIG. 4 only uses a relay apparatus A and a source apparatus B for detailed description.

S401: A relay apparatus generates network coding information.

Optionally, for step S401, reference may be made to the relevant description of step S201 in Embodiment 1, and details are not repeated herein.

S402: The relay apparatus sends the network coding information to a selection apparatus.

S403: The selection apparatus receives the network coding information sent by each relay apparatus.

The network coding information includes information of a candidate network coding vector set and a candidate transmission rate set, and transmission rates in the candidate transmission rate set are in one-to-one correspondence with network coding vectors in the candidate network coding vector set.

S404: The selection apparatus selects a full rank network matrix according to the network coding information.

Optionally, for step S404, reference may be made to the relevant description of step S202 in Embodiment 1, and details are not repeated herein.

S405: The selection apparatus sends the full rank network matrix to the relay apparatus, so that the relay apparatus codes received source node information according to the full rank network matrix.

S406: The source apparatus sends the source node information to the relay apparatus.

The source apparatus may be implemented by a sender.

S407: The relay apparatus codes the received source node information according to the full rank network matrix.

Optionally, for step S407, reference may be made to the relevant description of step S204 in Embodiment 1, and details are not repeated herein.

S408: The relay apparatus forwards the coded source node information.

S409: The sink apparatus decodes the received coded source node information.

Optionally, for step S409, reference may be made to the relevant description of step S206 in Embodiment 1, and details are not repeated herein.

In this way, the selection apparatus performs synthesis and selection according to the information of the candidate network coding vector set and the candidate transmission rate set in the network coding information, to obtain the full rank network matrix. The full rank network matrix ensures effectiveness of coding of received source node information performed by each relay apparatus on the network, so that the sink apparatus performs decoding correctly. Therefore, a case that a network coding system matrix is not full rank can be avoided, and correctness of decoding can be improved.

It should be noted that, the precedence of steps of the network coding method provided in the embodiment of the present invention may be appropriately adjusted, and the steps may also be correspondingly added or reduced according to conditions. Variation methods can be easily derived by any technical person skilled in the art within the technical scope disclosed in the present invention, so details are not repeated herein.

In the network coding method provided in the embodiment of the present invention, a relay apparatus or a selection apparatus performs selection according to information of a candidate network coding vector set and a candidate transmission rate set in network coding information, to obtain a full rank network matrix. The full rank network matrix ensures effectiveness of coding of received source node information performed by each relay apparatus on the network, so that a sink apparatus performs decoding correctly, which not only improves the correctness of decoding, but also increases an average network transmission rate and reduces a bit error rate.

Figure 5:
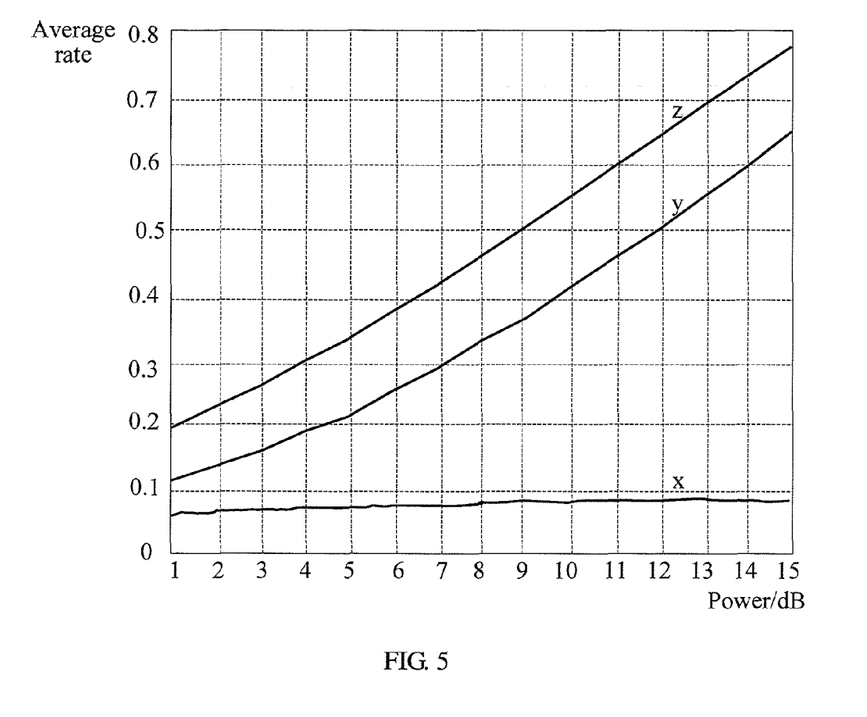
FIG. 5 is a schematic diagram of comparison between average transmission rates in a network coding method according to an embodiment of the present invention and those in other methods.

Illustratively, when there are two relay apparatuses, average transmission rates of the network coding method provided in the embodiment of the present invention and other methods are shown in FIG. 5. In FIG. 5, a line x represents an average transmission rate of a common network having channel interference, and in the network, the relay apparatus has only storage and forwarding functions, and does not perform any processing on data content; a line y represents a network average transmission rate of a relay apparatus separate optimization method, and in the method, each relay apparatus calculates an integer network coding vector, so as to maximize the transmission bit rate of the apparatus; and a line z represents an average transmission rate of a network adopting the network coding method provided in the embodiment of the present invention. Obviously, under the same power, the network adopting the network coding method provided in the embodiment of the present invention has a highest average transmission rate.

Figure 6:
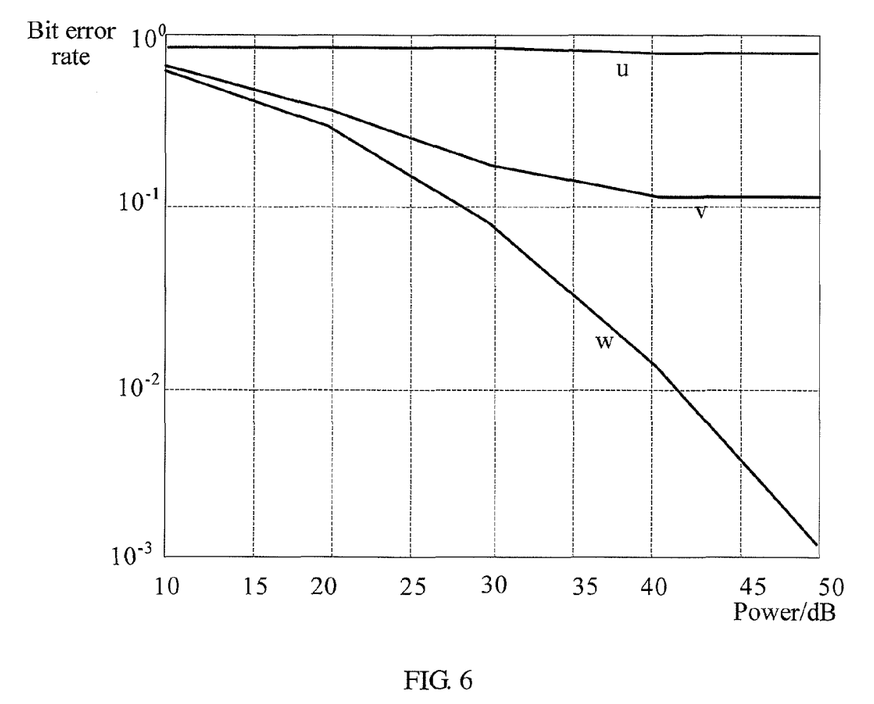
FIG. 6 is a schematic diagram of comparison between bit error rates in a network coding method according to an embodiment of the present invention and those in other methods.

For another example, when there are two relay apparatuses, bit error rates of the network coding method provided in the embodiment of the present invention and other methods are shown in FIG. 6. In FIG. 6, a line u represents a bit error rate of a common network having channel interference, and in the network, the relay apparatus has only storage and forwarding functions, and does not perform any processing on data content; a line v represents a bit error rate of a relay apparatus separate optimization method, and in the method, each relay apparatus calculates an integer network coding vector, so as to maximize the transmission bit rate of the apparatus; and a line w represents a bit error rate when the network coding method provided in the embodiment of the present invention is adopted. Obviously, under the same power, the network adopting the network coding method provided in the embodiment of the present invention has a lowest bit error rate.

Embodiment 3

Figure 7:
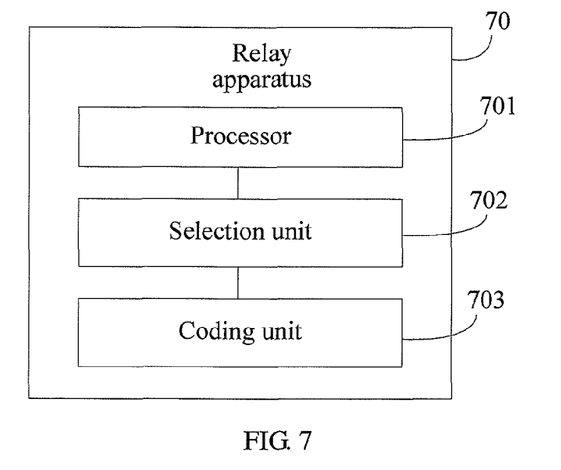
FIG. 7 is a schematic structural diagram of a relay apparatus according to an embodiment of the present invention.

A relay apparatus 70 provided in the embodiment of the present invention, whose main structure is shown in FIG. 7, includes:

a processor 701, configured to obtain network coding information, where the network coding information includes information of a candidate network coding vector set and a candidate transmission rate set, and transmission rates in the candidate transmission rate set are in one-to-one correspondence with network coding vectors in the candidate network coding vector set;

a selection unit 702, configured to select a full rank network matrix according to the network coding information; and a coding unit 703, configured to code received source node information according to the full rank network matrix. Illustratively, the coding unit may be implemented by using a coder.

In this way, the processor obtains the network coding information including the information of the candidate network coding vector set and the candidate transmission rate set; the selection unit performs selection according to the information of the candidate network coding vector set and the candidate transmission rate set in the network coding information, to obtain the full rank network matrix; and the coding unit performs coding by using the full rank network matrix, so that a sink apparatus performs decoding correctly. Therefore, a case that a network coding system matrix is not full rank can be avoided, and correctness of decoding can be improved.

The processor 701 is specifically configured to:

obtain all non-zero integer vectors to be used for selection of the candidate network coding vector set;

select a vector a satisfying $a^T Ga \leq C$ from the integer vectors, to form a vector set M and a corresponding rate set N, where C is a constant; a matrix G satisfies a formula $$G = I - \frac{P(hh^T)}{1 + P\|h\|^2},$$

where I is a unit matrix, P is transmit signal power, h is a channel vector from a source apparatus to the relay apparatus, and $\|h\|^2$ is a square of a modulus of a vector h; and $a^T$ is transposition of the vector a;

when the number of vectors in the vector set M is greater than or equal to a preset number t, sort transmission rates in the rate set N in descending order, and select first $t^{th}$ transmission rates that are relatively great, to form the candidate transmission rate set; and select, from the vector set M, vectors corresponding to the first $t^{th}$ transmission rates that are relatively great, to form the candidate network coding vector set.

Further, the processor 701 is further configured to:

obtain a vector b corresponding to a minimum characteristic value of the matrix G;

replace a numeral greater than 0 in the vector b with +1, and replace a numeral smaller than 0 with −1, to obtain an integer vector c; and based on $C = c^T Gc$, select the vector a satisfying $a^T Ga \leq C$ from the integer vector, to form the vector set M, and when the number of vectors in the vector set M is smaller than the preset number t, increase a value of the constant C. Illustratively, the constant C may be doubled.

The selection unit 702 may be configured to: sort all transmission rates in the candidate transmission rate set in descending order, to obtain a test rate set;

when the number of the relay apparatuses is n, use the $n^{th}$ transmission rate in the test rate set as a test rate;

select one network coding vector from each candidate network coding vector set corresponding to the relay apparatus, to form a test coding vector matrix, where a transmission rate corresponding to the selected network coding vector is greater than or equal to the test rate; and if the test coding vector matrix is a full rank matrix, determine that the test coding vector matrix is a full rank network matrix.

The selection unit 702 may be configured to:

a. sort all transmission rates in the candidate transmission rate set in descending order, to obtain a test rate set;

b. when the number of the relay apparatuses is n, use the $n^{th}$ transmission rate in the test rate set as a test rate;

c. select one network coding vector from each candidate network coding vector set corresponding to the relay apparatus, where a transmission rate corresponding to the selected network coding vector is greater than or equal to the test rate; and d. if a test coding vector matrix cannot be formed according to the selected network coding vector, or a test coding vector matrix formed according to the selected network coding vector is not a full rank matrix, sequentially use a transmission rate next to the current test rate in the test rate set as a new test rate, and repeat step c until it is determined that the test coding vector matrix is a full rank matrix.

The relay apparatus provided in this embodiment may be configured to execute steps of the method according to Embodiment 1. For example, the processor 701 may be specifically configured to execute step S101 of Embodiment 1, the selection unit 702 may be specifically configured to execute step S102 of Embodiment 1, and the coding unit 703 may be specifically configured to execute step S103 of Embodiment 1. Therefore, in the relay apparatus provided in the embodiment of the present invention, a processor obtains network coding information including information of a candidate network coding vector set and a candidate transmission rate set; a selection unit performs selection according to the information of the candidate network coding vector set and the candidate transmission rate set in the network coding information, to obtain a full rank network matrix; and a coding unit performs coding by using the full rank network matrix, so that a sink apparatus performs decoding correctly. Therefore, a case that a network coding system matrix is not full rank can be avoided, and correctness of decoding can be improved.

Figure 8:
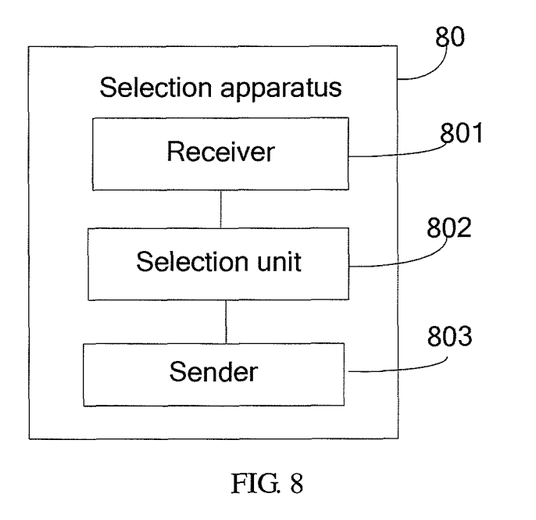
FIG. 8 is a schematic structural diagram of a selection apparatus according to an embodiment of the present invention.

A selection apparatus 80 provided in an embodiment of the present invention, whose specific structure is shown in FIG. 8, includes:

a receiver 801, configured to receive network coding information sent by each relay apparatus, where the network coding information includes information of a candidate network coding vector set and a candidate transmission rate set, and transmission rates in the candidate transmission rate set are in one-to-one correspondence with network coding vectors in the candidate network coding vector set;

a selection unit 802, configured to select a full rank network matrix according to the network coding information; and a sender 803, configured to send the full rank network matrix to the relay apparatus, so that the relay apparatus performs coding and forwarding on received source node information according to the full rank network matrix.

In this way, the selection unit performs selection according to the information of the candidate network coding vector set and the candidate transmission rate set in the network coding information received by the receiver, to obtain the full rank network matrix, and sends the full rank network matrix to the relay apparatus through the sender. The full rank network matrix ensures effectiveness of coding of received source node information performed by each relay apparatus on the network, so that the sink apparatus performs decoding correctly. Therefore, a case that a network coding system matrix is not full rank can be avoided, and correctness of decoding can be improved.

The selection unit 802 is specifically configured to:

sort all transmission rates in the candidate transmission rate set in descending order, to obtain a test rate set;

when the number of the relay apparatuses is n, use the $n^{th}$ transmission rate in the test rate set as a test rate;

select one network coding vector from each candidate network coding vector set corresponding to the relay apparatus, to form a test coding vector matrix, where a transmission rate corresponding to the selected network coding vector is greater than or equal to the test rate; and if the test coding vector matrix is a full rank matrix, determine that the test coding vector matrix is a full rank network matrix.

The selection unit 802 is further configured to:

a. sort all transmission rates in the candidate transmission rate set in descending order, to obtain a test rate set;

b. when the number of the relay apparatuses is n, use the $n^{th}$ transmission rate in the test rate set as a test rate;

c. select one network coding vector from each candidate network coding vector set corresponding to the relay apparatus, where a transmission rate corresponding to the selected network coding vector is greater than or equal to the test rate; and d. if a test coding vector matrix cannot be formed according to the selected network coding vector, or a test coding vector matrix formed according to the selected network coding vector is not a full rank matrix, sequentially use a transmission rate next to the current test rate in the test rate set as a new test rate, and repeat step c until it is determined that the test coding vector matrix is a full rank network matrix.

The selection apparatus provided in this embodiment may be configured to execute steps of the method according to Embodiment 2. For example, the receiver 801 may be specifically configured to execute step S403 of Embodiment 2, the selection unit 802 may be specifically configured to execute step S404 of Embodiment 2, and the sender 803 may be specifically configured to execute step S405 of Embodiment 2. Therefore, in the selection apparatus provided in the embodiment of the present invention, a selection unit performs selection according to information of a candidate network coding vector set and a candidate transmission rate set in the network coding information received by the receiver, to obtain a full rank network matrix, and sends the full rank network matrix to the relay apparatus through the sender. The full rank network matrix ensures effectiveness of coding of received source node information performed by each relay apparatus on the network, so that a sink apparatus performs decoding correctly. Therefore, a case that a network coding system matrix is not full rank can be avoided, and correctness of decoding can be improved.

A network coding system provided in the embodiment of the present invention includes: any relay apparatus provided in the embodiment of the present invention, or any selection apparatus provided in the embodiment of the present invention.

Definitely, the network coding system provided in the embodiment of the present invention may further include: a source apparatus, configured to send source node information to each relay node, so that the relay node performs coding and forwarding on the source node information. A sink apparatus is configured to receive and parse coded source node information sent by the relay node. The source apparatus and sink apparatus may be implemented by using a sender and a receiver respectively.

In this way, the relay apparatus or selection apparatus performs selection according to the information of the candidate network coding vector set and the candidate transmission rate set in the network coding information, to obtain the full rank network matrix. The full rank network matrix ensures effectiveness of coding of received source node information performed by each relay apparatus on the network, so that the sink apparatus performs decoding correctly. Therefore, a case that a network coding system matrix is not full rank can be avoided, and correctness of decoding can be improved.

Particularly, the network coding system may include more than two relay apparatuses and more than two source apparatuses. It should be noted that, the selection apparatus may be integrated in one relay apparatus in the network coding system; however, in order to improve a selection rate and reduce power consumption of the relay, the selection apparatus may also be deployed separately to achieve a selection effect.

An embodiment of the present invention further provides a processor, which is configured to obtain network coding information, where the network coding information includes information of a candidate network coding vector set and a candidate transmission rate set, and transmission rates in the candidate transmission rate set are in one-to-one correspondence with network coding vectors in the candidate network coding vector set; select a full rank network matrix according to the network coding information; and code received source node information according to the full rank network matrix. The processor may be connected to a memory, and the memory is configured to store information processed by the processor. For an action executed by the processor, reference may be made to the content in the network coding method provided in the foregoing embodiment, and details are not repeated herein. The processor may exist in a relay node, a base station, or a terminal, and is configured to perform coding on node information.

An embodiment of the present invention further provides a processor, which is configured to receive network coding information sent by a relay apparatus, where the network coding information includes information of a candidate network coding vector set and a candidate transmission rate set, and transmission rates in the candidate transmission rate set are in one-to-one correspondence with network coding vectors in the candidate network coding vector set; select a full rank network matrix according to the network coding information; and send the full rank network matrix to the relay apparatus, so that the relay apparatus codes received source node information according to the full rank network matrix. The processor may be connected to a memory, and the memory is configured to store information processed by the processor. For an action executed by the processor, reference may be made to the content of the network coding method provided in the foregoing embodiment, and details are not repeated herein. The processor may exist in a relay node, a base station, or a terminal, and is configured to perform coding on node information.

An embodiment of the present invention further provides a chip, where the chip is configured to perform network coding, and the chip may include the foregoing processor.

It can be clearly understood by persons skilled in the art that, for the purpose of convenient and brief description, for a detailed working process of the foregoing system, apparatus and unit, reference may be made to the corresponding process in the forgoing method embodiments, and the details will not be described herein again.

In several embodiments provided in the present application, it should be understood that the disclosed system, apparatus, and method may be implemented in other manners. For example, the described apparatus embodiments are merely exemplary. For example, the division of the units is merely logical function division and may be other division in actual implementation. For example, a plurality of units or components may be combined or integrated into another system, or some features may be ignored or not performed. In addition, the displayed or discussed couplings or direct couplings or communication connections may be implemented through some interfaces. The indirect couplings or communication connections between the apparatuses or units may be implemented in electrical, mechanical, or other forms.

The units described as separate components may be or may not be physically separated, and the components displayed as units may be or may not be physical units, that is, may be located in one position, or may be distributed on a plurality of network units. Some or all of the units may be selected to achieve the objective of the solution of the embodiment according to actual needs.

In addition, various functional units according to the embodiments of the present invention may be integrated in one processing unit, or each of the units may exist alone physically, or two or more units may be integrated in one unit. The integrated unit may be implemented through hardware, or may also be implemented in a form of hardware plus a software functional module.

The integrated unit implemented in the form of a software function unit may be stored in a computer readable storage medium. The software function unit is stored in a storage medium, and includes several instructions used to instruct computer equipment (such as a personal computer, a server, or network equipment) to execute a part of steps of the method described in the embodiments of the present invention. The storage medium includes any medium that can store program codes, such as a USB flash disk, a removable hard disk, a read-only memory (Read-Only Memory, ROM for short), a random access memory (Random Access Memory, RAM for short), a magnetic disk, or an optical disk.

The foregoing descriptions are merely specific embodiments of the present invention, but not intended to limit the present invention. Any variation or replacement readily figured out by persons skilled in the art within the technical scope of the present invention shall fall within the protection scope of the present invention. Therefore, the protection scope of the present invention shall be subject to the appended claims.

What is claimed is:

1. A network coding method, comprising:
obtaining network coding information, wherein the network coding information comprises information of a candidate network coding vector set and a candidate transmission rate set, and transmission rates in the candidate transmission rate set are in one-to-one correspondence with network coding vectors in the candidate network coding vector set;
selecting a full rank network matrix according to the network coding information; and
coding information received from a source node according to the full rank network matrix;
wherein obtaining network coding information comprises:
obtaining a non-zero integer vector to be used for selection of the candidate network coding vector set;
selecting a vector a satisfying $a^T Ga \leq C$ from the integer vector, to form a vector set M and a corresponding rate set N, wherein C is a constant; a matrix G satisfies a formula $$G = I - \frac{P(hh^T)}{1 + P\|h\|^2},$$

wherein I is a unit matrix, P is transmit signal power h is a channel vector from a source apparatus to a relay apparatus, and $\|h\|^2$ is a square of a modulus of a vector h; and $a^T$ is transposition of the vector a;
when the number of vectors in the vector set M is greater than or equal to a preset number t, sorting transmission rates in the rate set N in descending order, and selecting first $t^{th}$ transmission rates that are relatively great, to form the candidate transmission rate set; and selecting, from the vector set M, vectors corresponding to the first $t^{th}$ transmission rates that are relatively great, to form the candidate network coding vector set.

2. The method according to claim 1, wherein selecting a vector a satisfying $a^T Ga \leq C$ from the integer vector, to form a vector set M comprises:

obtaining a vector b corresponding to a minimum characteristic value of the matrix G;

replacing a numeral greater than 0 in the vector b with +1, and replacing a numeral smaller than 0 with −1, to obtain an integer vector c; and based on $C=c^T Gc$, selecting the vector a satisfying $a^T Ga \leq C$ from the integer vector, to form the vector set M.

3. The method according to claim 1, further comprising:

when the number of the vectors in the vector set M is smaller than the preset number t, increasing a value of the constant C.

4. The method according to claim 3, wherein increasing the value of the constant C is doubling the constant C.

5. A network coding method, comprising:

obtaining network coding information, wherein the network coding information comprises information of a candidate network coding vector set and a candidate transmission rate set, and transmission rates in the candidate transmission rate set are in one-to-one correspondence with network coding vectors in the candidate network coding vector set;

selecting a full rank network matrix according to the network coding information; and coding information received from a source node according to the full rank network matrix;

wherein selecting a full rank network matrix according to the network coding information comprises:

sorting all transmission rates in the candidate transmission rate set in descending order, to obtain a test rate set;

when the number of the relay apparatuses is n, using the $n^{th}$ transmission rate in the test rate set as a test rate;

selecting one network coding vector from each candidate network coding vector set corresponding to the relay apparatus, to form a test coding vector matrix, wherein a transmission rate corresponding to the selected network coding vector is greater than or equal to the test rate; and when the test coding vector matrix is a full rank matrix, determining that the test coding vector matrix is a full rank network matrix.

6. A network coding method, comprising:

obtaining network coding information, wherein the network coding information comprises information of a candidate network coding vector set and a candidate transmission rate set, and transmission rates in the candidate transmission rate set are in one-to-one correspondence with network coding vectors in the candidate network coding vector set;

selecting a full rank network matrix according to the network coding information; and coding information received from a source node according to the full rank network matrix;

wherein selecting a full rank network matrix according to the network coding information comprises:

sorting all transmission rates in the candidate transmission rate set in descending order, to obtain a test rate set;

when the number of the relay apparatuses is n, using the $n^{th}$ transmission rate in the test rate set as a test rate;

selecting one network coding vector from each candidate network coding vector set corresponding to the relay apparatus, wherein a transmission rate corresponding to the selected network coding vector is greater than or equal to the test rate; and when a test coding vector matrix cannot be formed according to the selected network coding vector, or a test coding vector matrix formed according to the selected network coding vector is not a full rank matrix, sequentially using a transmission rate next to the current test rate in the test rate set as a new test rate, and repeating step c until it is determined that the test coding vector matrix is a full rank matrix.

7. A network coding method, comprising:

receiving network coding information sent by a relay apparatus, wherein the network coding information comprises information of a candidate network coding vector set and a candidate transmission rate set, and transmission rates in the candidate transmission rate set are in one-to-one correspondence with network coding vectors in the candidate network coding vector set;

selecting a full rank network matrix according to the network coding information; and sending the full rank network matrix to the relay apparatus, wherein the relay apparatus codes information received from a source node according to the full rank network matrix;

wherein selecting a full rank network matrix according to the network coding information comprises:

sorting all transmission rates in the candidate transmission rate set in descending order, to obtain a test rate set;

when the number of the relay apparatuses is n, using the $n^{th}$ transmission rate in the test rate set as a test rate;

selecting one network coding vector from each candidate network coding vector set corresponding to the relay apparatus, to form a test coding vector matrix, wherein a transmission rate corresponding to the selected network coding vector is greater than or equal to the test rate; and when the test coding vector matrix is a full rank matrix, determining that the test coding vector matrix is a full rank network matrix.

8. A network coding method, comprising:

receiving network coding information sent by a relay apparatus, wherein the network coding information comprises information of a candidate network coding vector set and a candidate transmission rate set, and transmission rates in the candidate transmission rate set are in one-to-one correspondence with network coding vectors in the candidate network coding vector set;

selecting a full rank network matrix according to the network coding information; and sending the full rank network matrix to the relay apparatus, wherein the relay apparatus codes information received from a source node according to the full rank network matrix;

wherein selecting a full rank network matrix according to the network coding information comprises:

sorting all transmission rates in the candidate transmission rate set in descending order, to obtain a test rate set;

when the number of the relay apparatuses is n, using the n$^{th}$ transmission rate in the test rate set as a test rate;

selecting one network coding vector from each candidate network coding vector set corresponding to the relay apparatus, wherein a transmission rate corresponding to the selected network coding vector is greater than or equal to the test rate; and when a test coding vector matrix cannot be formed according to the selected network coding vector, or a test coding vector matrix formed according to the selected network coding vector is not a full rank matrix, sequentially using a transmission rate next to the current test rate in the test rate set as a new test rate, and repeating step c until it is determined that the test coding vector matrix is a full rank network matrix.

9. A relay apparatus, comprising:

a processor; and memory coupled to the processor, the memory comprising instructions that, when executed by the processor, cause the relay apparatus to:

obtain network coding information, wherein the network coding information comprises information of a candidate network coding vector set and a candidate transmission rate set, and transmission rates in the candidate transmission rate set are in one-to-one correspondence with network coding vectors in the candidate network coding vector set;

select a full rank network matrix according to the network coding information;

code information received from a source node according to the full rank network matrix;

obtain all non-zero integer vectors to be used for selection of the candidate network coding vector set;

select a vector a satisfying a$^T$Ga≤C from the integer vectors, to form a vector set M and a corresponding rate set N, wherein C is a constant; a matrix G satisfies a formula $$G = I - \frac{P(hh^T)}{1 + P\|h\|^2},$$

10 wherein I is a unit matrix, P is transmit signal power, h is a channel vector from a source apparatus to the relay apparatus, and $\|h\|^2$ is a square of a modulus of a vector h; and a$^T$ is transposition of the vector a;

when the number of vectors in the vector set M is greater than or equal to a preset number t, sort transmission rates in the rate set N in descending order, and select first t$^{th}$ transmission rates that are relatively great, to form the candidate transmission rate set; and select, from the vector set M, vectors corresponding to the first t$^{th}$ transmission rates that are relatively great, to form the candidate network coding vector set.

10. The apparatus according to claim 9, wherein the memory comprises instructions that, when executed by the processor, cause the relay apparatus to:

when the number of the vectors in the vector set M is smaller than the preset number t, increase a value of the constant C.

11. The apparatus according to claim 10, wherein increasing a value of the constant C is doubling the constant C.

12. A relay apparatus, comprising:

a processor; and memory coupled to the processor, the memory comprising instructions that, when executed by the processor, cause the relay apparatus to:

obtain network coding information, wherein the network coding information comprises information of a candidate network coding vector set and a candidate transmission rate set, and transmission rates in the candidate transmission rate set are in one-to-one correspondence with network coding vectors in the candidate network coding vector set;

select a full rank network matrix according to the network coding information;

code information received from a source node according to the full rank network matrix;

sort all transmission rates in the candidate transmission rate set in descending order, to obtain a test rate set;

when the number of the relay apparatuses is n, use the n$^{th}$ transmission rate in the test rate set as a test rate;

select one network coding vector from each candidate network coding vector set corresponding to the relay apparatus, to form a test coding vector matrix, wherein a transmission rate corresponding to the selected network coding vector is greater than or equal to the test rate; and when the test coding vector matrix is a full rank matrix, determine that the test coding vector matrix is a full rank network matrix.

13. A relay apparatus, comprising:

a processor; and memory coupled to the processor, the memory comprising instructions that, when executed by the processor, cause the relay apparatus to:

obtain network coding information, wherein the network coding information comprises information of a candidate network coding vector set and a candidate transmission rate set, and transmission rates in the candidate transmission rate set are in one-to-one correspondence with network coding vectors in the candidate network coding vector set;

select a full rank network matrix according to the network coding information;

code information received from a source node according to the full rank network matrix;

sort all transmission rates in the candidate transmission rate set in descending order, to obtain a test rate set;

when the number of the relay apparatuses is n, use the n$^{th}$ transmission rate in the test rate set as a test rate;

select one network coding vector from each candidate network coding vector set corresponding to the relay apparatus, wherein a transmission rate corresponding to the selected network coding vector is greater than or equal to the test rate; and when a test coding vector matrix cannot be formed according to the selected network coding vector, or a test coding vector matrix formed according to the selected network coding vector is not a full rank matrix, sequentially use a transmission rate next to the current test rate in the test rate set as a new test rate, and repeat step c until it is determined that the test coding vector matrix is a full rank matrix.

14. A selection apparatus, comprising:

a processor; and memory coupled to the processor, the memory comprising instructions that, when executed by the processor, cause the selection apparatus to:

receive network coding information sent by a relay apparatus, wherein the network coding information comprises information of a candidate network coding vector set and a candidate transmission rate set, and transmission rates in the candidate transmission rate set are in one-to-one correspondence with network coding vectors in the candidate network coding vector set;

select a full rank network matrix according to the network coding information;

sort all transmission rates in the candidate transmission rate set in descending order, to obtain a test rate set;

when the number of the relay apparatuses is n, use the $n^{th}$ transmission rate in the test rate set as a test rate;

select one network coding vector from each candidate network coding vector set corresponding to the relay apparatus, to form a test coding vector matrix, wherein a transmission rate corresponding to the selected network coding vector is greater than or equal to the test rate; and when the test coding vector matrix is a full rank matrix, determine that the test coding vector matrix is a full rank network matrix; and a transmitter that sends the full rank network matrix to the relay apparatus, so that the relay apparatus codes information received from a source node according to the full rank network matrix.

15. A selection apparatus, comprising:

a processor; and memory coupled to the processor, the memory comprising instructions that, when executed by the processor, cause the selection apparatus to:

receive network coding information sent by a relay apparatus, wherein the network coding information comprises information of a candidate network coding vector set and a candidate transmission rate set, and transmission rates in the candidate transmission rate set are in one-to-one correspondence with network coding vectors in the candidate network coding vector set;

select a full rank network matrix according to the network coding information;

sort all transmission rates in the candidate transmission rate set in descending order, to obtain a test rate set;

when the number of the relay apparatuses is n, use the $n^{th}$ transmission rate in the test rate set as a test rate;

select one network coding vector from each candidate network coding vector set corresponding to the relay apparatus, wherein a transmission rate corresponding to the selected network coding vector is greater than or equal to the test rate; and when a test coding vector matrix cannot be formed according to the selected network coding vector, or a test coding vector matrix formed according to the selected network coding vector is not a full rank matrix, sequentially use a transmission rate next to the current test rate in the test rate set as a new test rate, and repeat step c until it is determined that the test coding vector matrix is a full rank network matrix; and a transmitter that sends the full rank network matrix to the relay apparatus, so that the relay apparatus codes information received from a source node according to the full rank network matrix.

\* \* \* \* \*